United States Patent Office 2,932,828
Patented Apr. 19, 1960

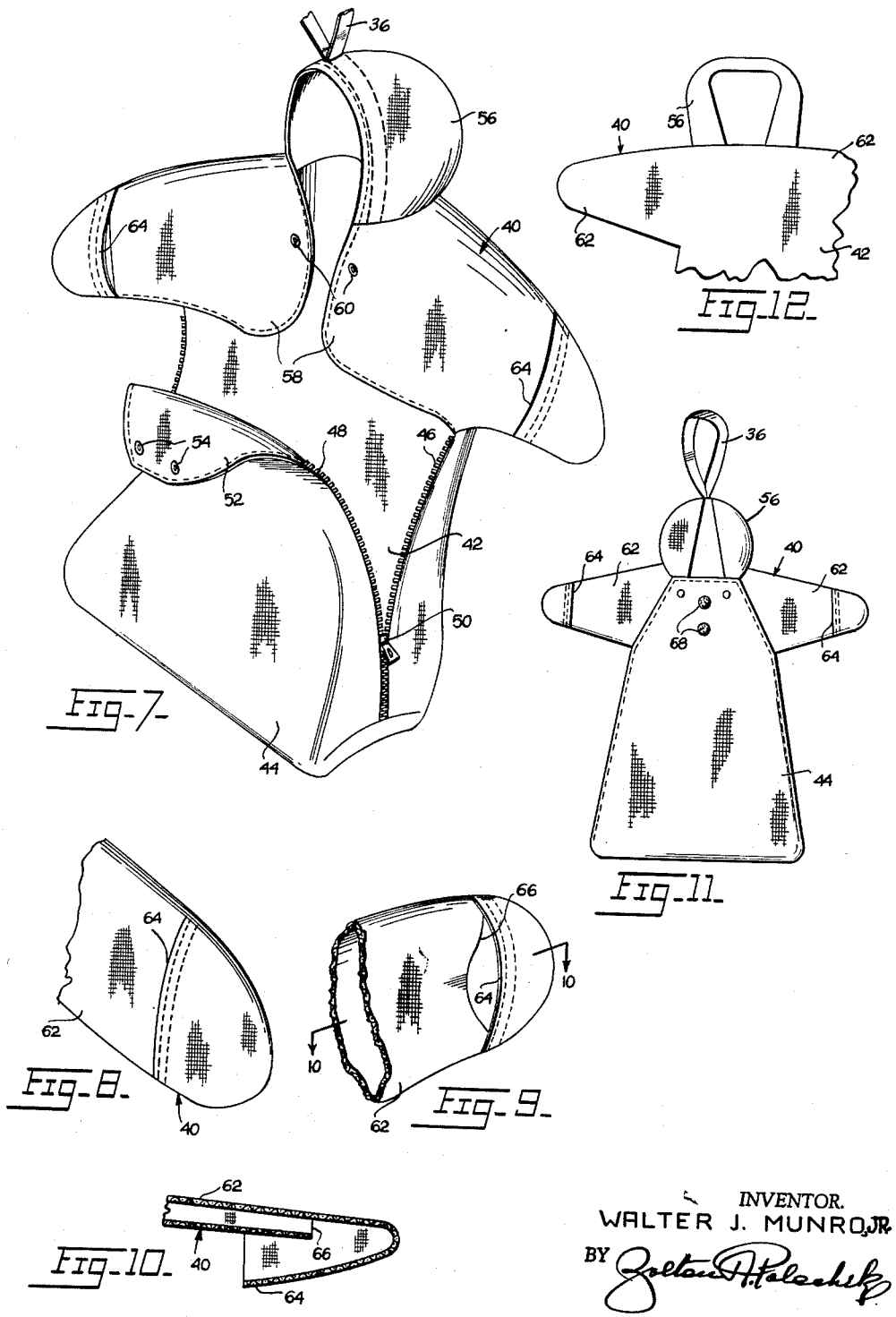

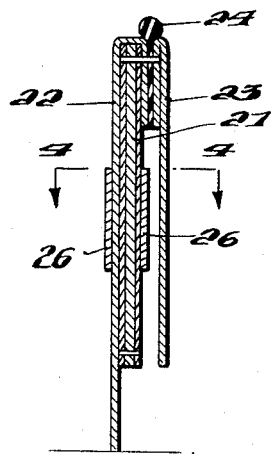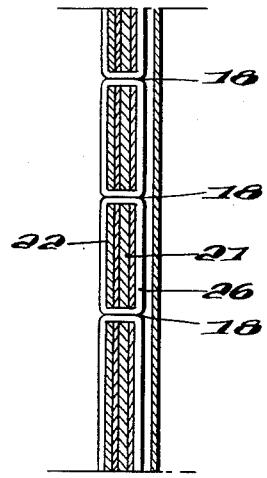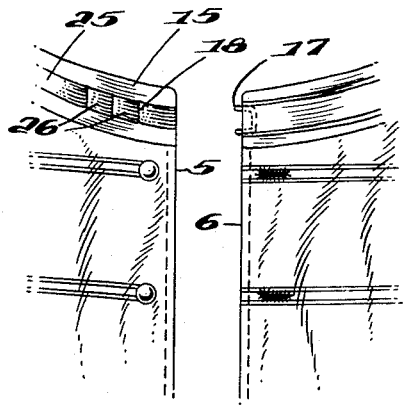

2,932,828
ADJUSTABLE COLLAR FOR MILITARY COATS

Adolph Ostwald, Staten Island, N.Y., assignor to Uniforms by Ostwald, Inc., Staten Island, N.Y., a corporation of New York Application October 14, 1957, Serial No. 689,986
2 Claims. (Cl. 2—98)

This invention relates to an adjustable collar for military coats and the like.

Previously, in military coats, it has been the procedure to cut the coats and collars in such a way that when the front overlapping portions of the coat are buttoned together, the front portions of the collar are merely butted together and fastened. This collar design was satisfactory as long as there was no attempt at making the collar adjustable in diameter depending on the neck size of the wearer. Hooks were provided to join the collar ends and inside the collar, a cloth tab or extension was provided to protect the neck of the wearer from the collar hook. This tab was sewn to the inside of the collar to one side of the direct front of the collar, and was constructed of a soft material designed to prevent chafing.

Later attempts were made to utilize this tab for collar adjustment purposes by placing a button hole in the end of the tab and adding buttons to the other side of the collar. Of course, when this feature was used, hooks on the butting portions of the collar were released. Because of the softness of the tab material and the fact that it is not attached to the actual body of the coat, the collar and the coat had a tendency to swing out of position or askew when the coat was buttoned presenting an unsightly appearance so that this method did not satisfactorily achieve the desired result.

The present invention comprises primarily an improvement in making an adjustable collar for military coats. In the present invention, the collar ends are extended in such a way that when the coat front portions are buttoned and in their overlapping position, the front portions of the collar are also overlapping. Collar adjustability is obtained by placing a series of fasteners along the front of the collar on one side of the collar, and a hook means on the other side of the collar such that the amount of overlapping of the front portions of the collar can be varied, and the collar can thus be adjusted to the neck size of the wearer.

It is a primary object of the invention to provide an adjustable military collar constructed in such a manner as to hold the coat and collar overlapping front portions firmly in position, and to prevent them from presenting any askew appearance.

It is another object to form the collar in such a way that the adjustable portions of the collar are sewn firmly to the coat.

It is a still further object to construct the adjustable portions of the collar of a stiff material similar to the collar itself. It is furthermore an object of the invention to construct a collar in such a way that regardless of the amount of adjustment made in the collar, the collar design presents an unbroken appearance.

These and other objects will become apparent upon consideration of the following detailed description in connection with the accompanying drawings wherein:

Figure 1 is a front view showing a prior art adjustable military collar;

Figure 2 is a front view illustrating the adjustable military collar according to the present invention;

Figure 3 is a cross sectional view along line 3—3 of Figure 2 showing the construction of the collar itself;

Figure 4 is a cross sectional view along the line 4—4 of Fig. 3;

Figure 5 illustrates a modified collar design.

Referring to Fig. 1, an example of the present prior art means of making a military collar adjustable is shown. The collar 2 is rigidly attached to the coat 1 in such a way that when the front portions of the coat 5 and 6 are overlapped and fastened in place by means of buttons 3 and holes 4, the front portions of the collar 7 and 10 merely butt together. These front portions of the collar are hooked by hooks 8 and 9. Tab 11 is sewn onto the front portion 10 of the collar and protects the neck of the wearer from the hooks 8 and 9. The collar is made adjustable by placing holes 12 in the tab and buttons 13 on the inside of the front portions 7 of the collar. When the tab is used to join the collar ends, the hooks 7 and 9 are released from each other and the desired button 13 is placed in hole 12. This method has the disadvantage that when the tab 11 is used thus to fasten the collar, there is insufficient rigidity between the collar fastenings and the coat to prevent the coat overlapping portions 5 and 6 from falling askew. In other words, when tab 11 is fastened to button 13, there is nothing to prevent the front portions 5 and 6 from sliding vertically with respect to each other. This will also throw the collar portions 7 and 10 out of position with respect to each other.

The present invention is illustrated in Fig. 2. This figure also shows the collar rigidly attached to the coat. However, whereas in former constructions the collar stopped at point 14 on coat, the collar here is extended clear to the coat edge 5. The primary feature of the invention is in constructing the collar in such a manner that when the front portions 5 and 6 of the coat are buttoned in their overlapped position by means of buttons 3 and holes 4, the collar portions 15 and 16 will also overlap. Adjustability is provided by having hook means 17 on collar portion 16 insertable in slots 18 cut into collar portion 15. Because the collar portion 15 is constructed in the same manner and of the same material as the rest of the collar and is further rigidly attached to the coat at seams 19 and 20, there is no possibility for the coat portions 5 and 6 and collar portions 15 and 16 to become vertically askew with respect to each other.

Another fastening means can be used with respect to the adjustable collar. Rather than having slots 18 provided in collar portion 15, one could pleat the cloth or braid it in such a way that the hook 17 can be inserted in a variety of positions. The pleats would form a fastener or catch means for the collar hook. Also metal eyes could be added to the collar extension 15 providing a third fastening device.

The construction of the collar as shown in Figs. 3 and 4 is an important feature of the invention. The collar 2 is constructed basically in a normal manner, comprising an internal buckram 21, the outer cloth 22, and the inner lining 23. The outer cloth 22 and the inner lining 23 are folded over at the top as illustrated in Fig. 3. The buckram 21 can be seen to comprise two layers of cloth separated by stiffening or sizing.

A plastic piping 24 having a rounded upper edge and a downwardly extending portion is inserted into the collar having its downwardly extending portion sewn, as shown, into the collar between the inner and outer layers 22 and 23. This piping provides an excellent wear surface at the top of the collar, and protects the collar from perspiration of the wearer. This piping extending around the top edge of the collar, also extends onto the collar portion 15. An additional section of cloth material 26 is sewn on the collar circumscribing and enveloping a portion of the collar between slots 18 as shown in Figs. 3 and 4. This cloth completely surrounds the buckram 21 and outer layer 22 in the area where the slots 18 are located. The cloth 26 is mounted in the form of loops which are passed through the slots 18 and the free ends then sewn together so as to leave a series of closed loops, as seen by Figure 4 and between which the hook 17 is inserted when the coat is fastened.

It should be noted that this cloth portion 26 is of the same material as the collar decorative braiding 25 (Fig. 2). Thus another important advantage is evident, namely, that regardless of where the collar ends are overlapped, the decorative braiding will present an unbroken appearance from the front. This is distinctly in contrast to the appearance presented by the adjustable military collars of the prior art, wherein the design was broken due to separation of the collar ends. Furthermore, the braid trim is advantageously used to camouflage the adjustable means in the collar.

A final feature of the collar construction should be noted. The slots 18 do not extend through the inner lining 23 as can be clearly seen in Fig. 4. Thus the wearer is protected from chafing which might be caused by the inserted portion of the hook 17.

A modification of the invention is shown in Fig. 5. The extension 15 can be a continuation of the collar. In other words, the collar can merely be made longer to extend up to the edges 5 and 6 of the coat. As in the example of Fig. 2, slots 18 would cut through the cloth 22 and buckram 21 of the collar itself, not penetrating through the lining 23. In the primary example shown in Fig. 2 the portion 15 comprises a separate extension sewn onto the collar and coat at seams 19 and 20. This extension portion 15 is constructed in the same manner as the collar, as shown in Fig. 3, comprising the outer cloth, buckram, an inner lining, but the collar end at seam 20 actually overlaps the extension portion 15. Thus when the collar is fastened, the portions 20 and 21 of the collar actually butt forming a smooth unbroken outer surface. The importance of this construction is that military coats presently made according to the prior art example of Fig. 1 can be easily modified according to the concepts of this invention. The modification of Figure 5 however shows extending the collar fully to edges of the coat. This form of the invention is important since it affords a less expensive method of construction, and eliminates seam 20, Fig. 2, from the collar.

It is to be understood that the forms of the invention shown herewith and described are preferred examples of the invention, and various changes relative to the material, size, shape and arrangement of parts may be resorted to without departing from the spirit of the invention as defined in the claims.

Having described the invention, what is claimed is:

1. In a military coat of the class described having overlapping front portions, an adjustable collar comprising an outer cloth secured to the upper edge of the coat and extending around the entire upper edge of the neck portion thereof, a buckram and inner lining secured to said outer cloth, an outer facing cloth of substantially the same material as said outer cloth having decorative braiding thereon extending from a first end of the collar to a point spaced from the other end thereof, the decorative braiding being disposed on the end portion of the collar between the end of the outer facing cloth and the adjacent edge of the collar, slots formed in said end portion and fastener means mounted on said first end of the collar whereby the collar may be adjusted in length while maintaining a generally continuous appearance.

2. In a military coat as claimed in claim 1 and further including plastic piping around the upper edge of said collar.

References Cited in the file of this patent

UNITED STATES PATENTS

| | | |
|---|---|---|
| 899,853 | Willard | Sept. 29, 1908 |
| 1,110,187 | Cooper | Sept. 8, 1914 |
| 1,499,857 | David | July 1, 1924 |
| 1,603,324 | David | Oct. 19, 1926 |
| 1,688,880 | Pope et al. | Oct. 23, 1928 |
| 1,905,685 | Safir et al. | Apr. 25, 1933 |
| 2,079,877 | Rosenwasser | May 11, 1937 |
| 2,255,183 | Ostwald | Sept. 9, 1941 |

FOREIGN PATENTS

| | | |
|---|---|---|
| 332,368 | France | Oct. 27, 1903 |